(12) United States Patent
Kim

(10) Patent No.: US 8,490,613 B2
(45) Date of Patent: Jul. 23, 2013

(54) OVEN RANGE WITH GAS FILTER

(75) Inventor: Tae Hun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 406 days.

(21) Appl. No.: 12/654,898

(22) Filed: Jan. 7, 2010

(65) Prior Publication Data

US 2010/0186729 A1    Jul. 29, 2010

(30) Foreign Application Priority Data

Jan. 23, 2009  (KR) .................. 10-2009-0006146

(51) Int. Cl.
F24C 15/32 (2006.01)

(52) U.S. Cl.
USPC ........... 126/21 R; 126/19 R; 126/307 R; 126/312; 454/158

(58) Field of Classification Search
USPC ............. 126/19 R, 21 R, 307 R, 312; 55/521; 454/158
See application file for complete search history.

(56) References Cited

U.S. PATENT DOCUMENTS

| | | | | |
|---|---|---|---|---|
| 2,395,298 A * | 2/1946 | Shock, Jr. | ............ | 55/499 |
| 2,968,361 A * | 1/1961 | Buckman | ............ | 55/419 |
| 3,069,831 A * | 12/1962 | Young et al. | ............ | 55/521 |
| 3,465,413 A * | 9/1969 | Rosaen et al. | ............ | 29/428 |
| 4,592,333 A * | 6/1986 | Dustin | ............ | 126/21 R |
| 4,834,700 A * | 5/1989 | Kondo et al. | ............ | 493/463 |
| 4,976,857 A * | 12/1990 | Solomon | ............ | 210/493.5 |
| 5,158,586 A * | 10/1992 | Layton | ............ | 55/497 |
| 5,238,477 A * | 8/1993 | Layton | ............ | 55/497 |
| 5,404,801 A * | 4/1995 | Holland | ............ | 99/482 |
| 5,558,689 A * | 9/1996 | Yanagihara et al. | ............ | 55/492 |
| 6,116,430 A * | 9/2000 | Horton | ............ | 210/411 |
| 6,148,817 A * | 11/2000 | Bryant et al. | ............ | 128/207.11 |
| 6,336,946 B1 * | 1/2002 | Adams et al. | ............ | 55/385.3 |
| 6,485,544 B1 * | 11/2002 | Ziske | ............ | 95/273 |
| 6,564,947 B2 * | 5/2003 | Bakula | ............ | 210/388 |
| 6,913,012 B2 * | 7/2005 | Divett et al. | ............ | 126/21 A |
| 7,169,202 B2 * | 1/2007 | Kubokawa | ............ | 55/495 |
| 7,404,839 B2 * | 7/2008 | Modesto et al. | ............ | 55/502 |
| 7,625,417 B2 * | 12/2009 | Yang | ............ | 55/487 |
| 7,670,403 B2 * | 3/2010 | Modesto et al. | ............ | 55/502 |
| 7,718,143 B2 * | 5/2010 | Ogura | ............ | 422/180 |
| 7,959,702 B2 * | 6/2011 | Rocklitz et al. | ............ | 55/521 |
| 7,998,258 B2 * | 8/2011 | Goto et al. | ............ | 96/134 |
| 2001/0052515 A1 * | 12/2001 | Allera et al. | ............ | 219/413 |
| 2005/0195523 A1 * | 9/2005 | Abe et al. | ............ | 360/97.02 |
| 2006/0053759 A1 * | 3/2006 | Winters et al. | ............ | 55/497 |
| 2006/0288556 A1 * | 12/2006 | Hodgson | ............ | 29/421.1 |

(Continued)

FOREIGN PATENT DOCUMENTS

| | | | |
|---|---|---|---|
| CN | 1895062 A | * | 1/2007 |
| JP | 2000-300436 | | 10/2000 |
| KR | 10-2004-0100040 | | 12/2004 |

*Primary Examiner* — Kenneth Rinehart
*Assistant Examiner* — Jorge Pereiro
(74) *Attorney, Agent, or Firm* — Staas & Halsey LLP

(57) ABSTRACT

Disclosed herein is an oven range with a filter member improving the purification efficiency of toxic gas in a cavity. The filter member includes a plurality of sections inclined upward or downward with respect to one another and interconnected, with curves irregularly formed along the sections. Accordingly, since the toxic gas being discharged through the filter member is dispersed, entangled and mixed by the irregular curves of the filter member, a reaction time between the toxic gas and a catalyst coating the filter member is increased, thereby improving the purification efficiency.

15 Claims, 7 Drawing Sheets

U.S. PATENT DOCUMENTS

2007/0256399 A1* 11/2007 Yang ............................... 55/418
2007/0270095 A1* 11/2007 Shimoyama et al. ......... 454/148
2009/0127211 A1* 5/2009 Rocklitz et al. ............... 210/767
2009/0211696 A1* 8/2009 Moe et al. ..................... 156/205
2010/0032365 A1* 2/2010 Moe et al. ..................... 210/470
2010/0078379 A1* 4/2010 Rocklitz .................... 210/493.1

* cited by examiner

OVEN RANGE WITH GAS FILTER

CROSS-REFERENCE TO RELATED APPLICATIONS

This application claims the benefit of Korean Patent Application No. 2009-0006146, filed on Jan. 23, 2009 in the Korean Intellectual Property Office, the disclosure of which is incorporated herein by reference.

BACKGROUND

1. Field

Embodiments of the present invention relate to an oven range configured to discharge toxic gas from the inside of a cavity.

2. Description of the Related Art

Generally, an oven range refers to a cooking device including an oven that heats food in a hermetic cavity and a range that cooks food by directly heating a container containing the food on a gas burner or an electric heater, in a combined manner.

The oven range conventionally includes a gas outlet disposed at one side of an upper surface of the cavity to discharge gas generated in the cavity to the outside. The gas outlet is equipped with a filter member that purifies the gas being discharged through the gas outlet. Additionally, a discharge duct is connected to the gas outlet to guide the gas purified by the filter member to the outside.

Such an oven range may perform self-cleaning to remove foreign substances by heating, where the foreign substances have been accumulated in the cavity during cooking. Heating of the foreign substances may induce generation of toxic gas, such as CO. The toxic gas generated by the self-cleaning is purified by the filter member and discharged through the gas outlet and the discharge duct.

However, the filter member generally adopted in the conventional oven range has a simple honeycomb structure and therefore is limited to perfectly purify the toxic gas in the cavity.

SUMMARY

Therefore, it is an aspect to provide an oven range improved in performance of a filter member that purifies toxic gas being discharged from the inside of a cavity of the oven range.

Additional aspects will be set forth in part in the description which follows and, in part, will be obvious from the description, or may be learned by practice of the invention.

The foregoing and/or other aspects are achieved by providing an oven range including a cavity having a gas outlet, a discharge duct connected to the gas outlet, and a filter member disposed at the gas outlet to purify toxic gas generated in the cavity and discharged through the gas outlet, where the filter member includes a plurality of sections inclined upward or downward with respect to one another and interconnected.

Among the sections of the filter member, one of the sections adjoining an upwardly inclined section may be inclined downward.

Curve points formed at connection parts of the respective sections of the filter member may have respectively different heights with respect to an outer side of the filter member.

The sections of the filter member may have respectively different areas.

Each of the sections of the filter member may have at least one point of inflection.

At least one of the sections of the filter member may have a horizontal portion.

The filter member may be coated with a catalyst comprising Pd and Pt.

The sections of the filter member may be inclined upward with respect to a central longitudinal axis of the filter member.

The sections may be alternately inclined upward and downward with respect to adjoining sections.

The foregoing and/or other aspects are achieved by providing a filter member for an oven range, disposed at a gas outlet formed at a cavity of the oven range, the filter member including a plurality of sections inclined upward or downward with respect to one another and interconnected such that an upwardly inclined section is connected to a downwardly inclined section.

Curve points formed at connection parts of the respective sections of the filter member may have respectively different heights.

The sections of the filter member may have respectively different areas.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENT

Figure 1:
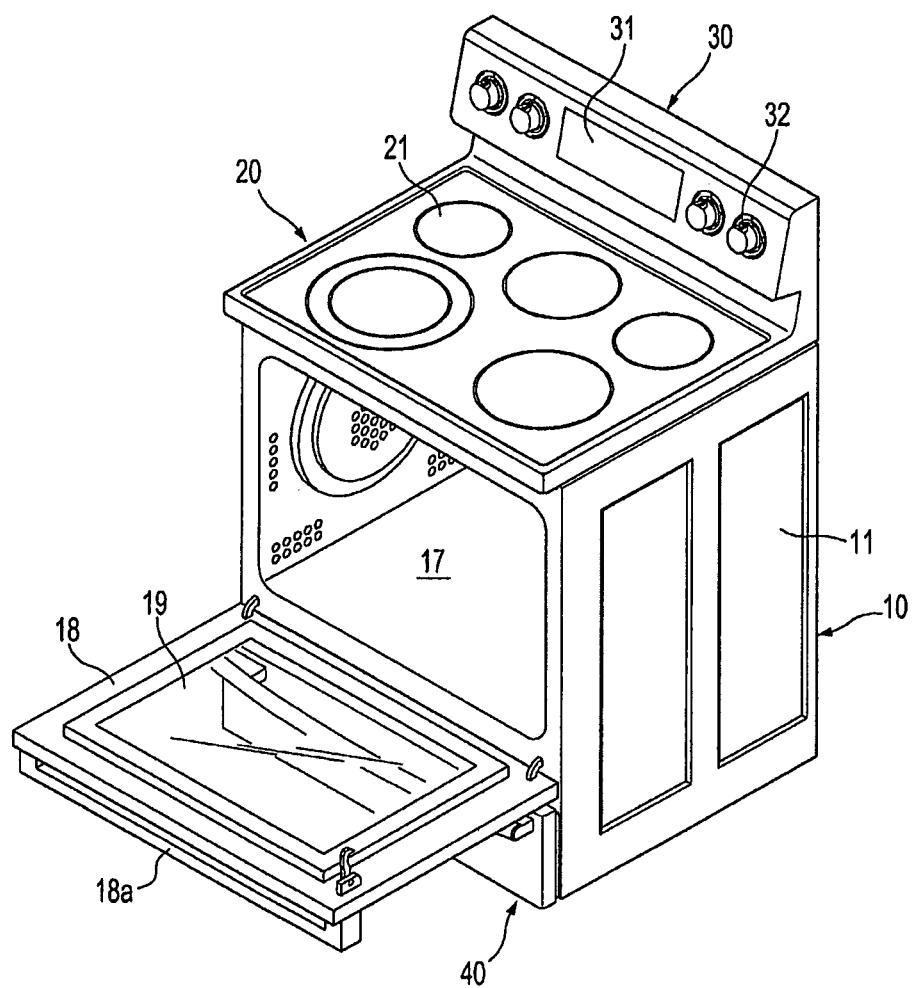
FIG. 1 is a perspective view of an oven range according to an embodiment.

Reference will now be made in detail to the embodiment, examples of which are illustrated in the accompanying drawings, wherein like reference numerals refer to the like elements throughout.

Figure 2:
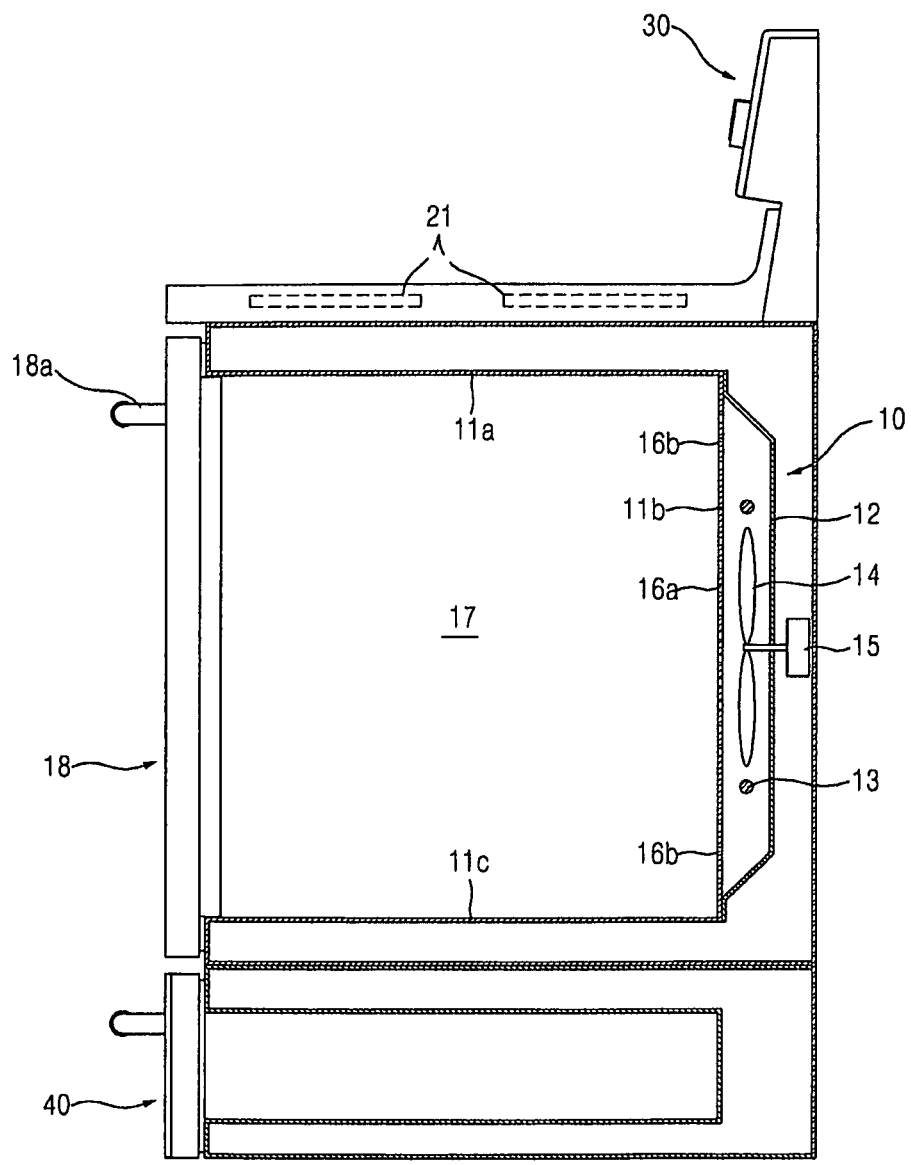
FIG. 2 is a sectional view of the oven range shown in FIG. 1.

FIG. 1 is a perspective view of an oven range according to an embodiment and FIG. 2 is a sectional view of the oven range shown in FIG. 1.

Referring to FIG. 1 and FIG. 2, the oven range includes an oven unit 10 heating food in a hermetic state and cooking the food, a range unit 20 including heaters 21 disposed above the oven unit 10 to cook food contained in a food container placed on the range unit 20, a control unit 30 disposed behind the range unit 20 to control the operations of the oven unit 10 and the range unit 20, and a drawer unit 40 disposed under the oven unit 10 to serve as storage or to perform simple cooking.

The oven unit 10 cooks food using convection of heat. For this purpose, the oven unit 10 includes a main body 11 constituting an exterior structure, a cavity 17 formed in the main body 11 and opened to the front, and a door 18 opening and closing the opened front side of the cavity 17. A transparent cover 19, for example, may be provided on the front door handle 18a may be provided on the door 18.

The main body 11 is constituted by an upper board 11a, a bottom board 11c, both side boards (not shown) and a rear board 11b which are integrally or separately formed with one another. A fan cover 12 is connected to an outer side of the rear board 11b to mount therein a convection fan 14 configured to forcibly circulate heat generated in the cavity 17. A motor 15 is mounted at a rear of the convection fan 14 to drive the convection fan 14.

An electric heater 13 is mounted to an outer circumference of the convection fan 14. According to an embodiment, the electric heater 13 may include a sheathe heater exhibiting an excellent thermal efficiency for efficient heating of food. A plurality of suction holes 16a formed around the center of the rear board 11b facing the convection fan 14 draw in the air from the cavity 17, and a plurality of discharge holes 16b formed at the periphery of the rear board 11b supply hot air into the cavity therethrough.

The control unit 30 protrudes upward from a rear end of the range unit 20. The control unit 30 that controls the operation of the oven range includes a display 31 displaying information including an operational state of the oven range and a cooking time, and a series of operational knobs 32, for example, to control operations of the oven range, however the control unit 30 is not limited to operational knobs, but may include any of a variety of user input mechanisms.

The drawer unit 40 has a drawer form to simply store cookers or food. Furthermore, the drawer unit 40 may further include a heater (not shown) to heat cooked food or perform simple cooking.

Figure 3:
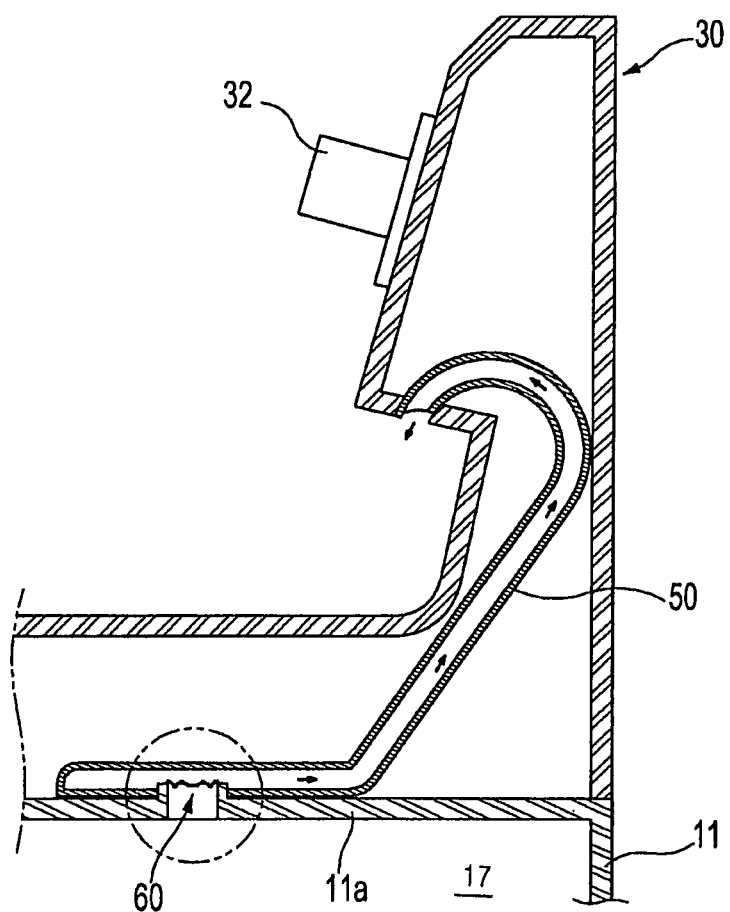
FIG. 3 is a sectional view showing a toxic gas discharging structure of the oven range shown in FIG. 1.
Figure 4:
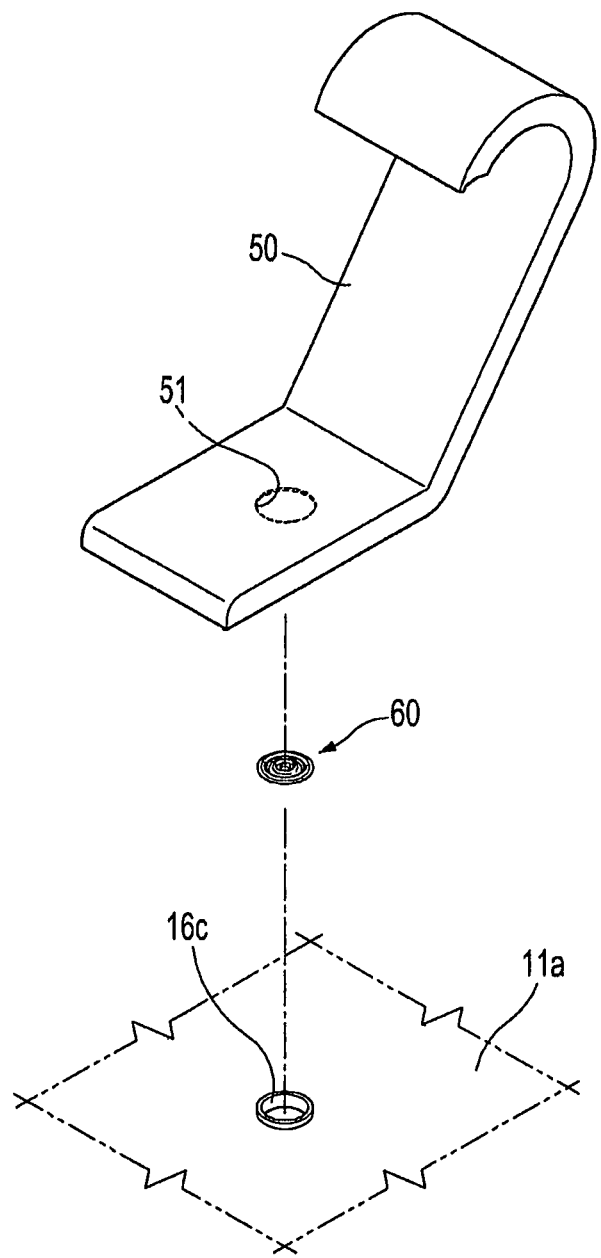
FIG. 4 is an exploded perspective view of FIG. 3.

FIG. 3 is a sectional view showing a toxic gas discharging structure of the oven range shown in FIG. 1. FIG. 4 is an exploded perspective view of FIG. 3.

As shown in FIG. 3 and FIG. 4, a gas outlet 16c is formed at a rear part of the upper board 11a of the main body 11 of the oven unit 10 so as to discharge toxic gas generated in the cavity 17. The gas outlet 16c may have a substantially circular form, although is not limited thereto and may be any of a variety of shaped able to discharge toxic gas, protruded by a predetermined degree from an upper surface of the main body 11. The gas outlet 16c is provided to discharge toxic gas, such as CO, generated in the cavity 17 during cooking or self-cleaning for removal of foreign substances accumulated in the cavity 17.

A discharge duct 50 is connected to the gas outlet 16c to guide the toxic gas being discharged through the gas outlet 16c to a lower part of the control unit 30 so that the toxic gas is discharged to the front of the control unit 30. The discharge duct 50 is bent upward from a lower part thereof by a predetermined angle and curved toward the front at an upper part thereof. Here, an insertion hole 51 is formed at a lower surface of the discharge duct 50 to receive the protruded part of the gas outlet 16c.

In addition, a filter member 60 is provided to the gas outlet 16c to purify the toxic gas being discharged through the gas outlet 16c. The filter member 60 may have a mesh form made of stainless steel, but is not limited thereto and may be any type of filter that purifies toxic gas.

The filter member 60 may be coated with a catalyst to purify the toxic gas, such as CO discharged through the gas outlet 16c. Materials that oxidize the toxic gas, such as Pt, Pd and the like, may be used for the catalyst.

Figure 5:
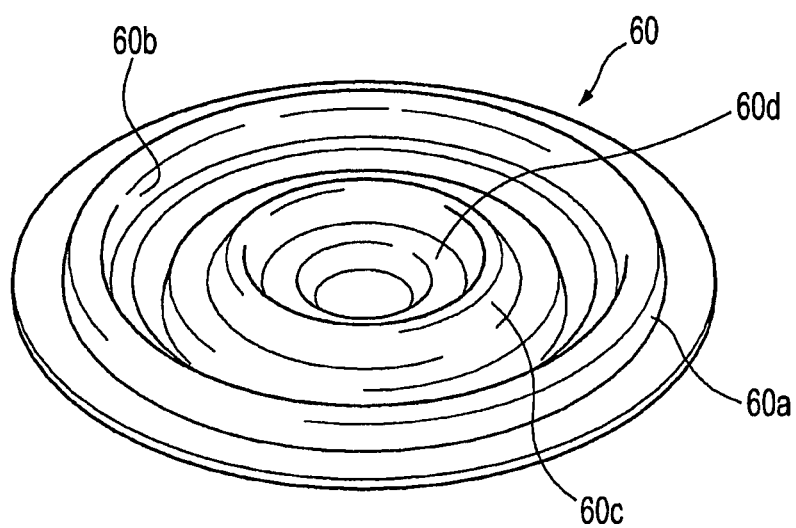
FIG. 5 is a perspective view of a filter member of the oven range according to the embodiment.
Figure 6:
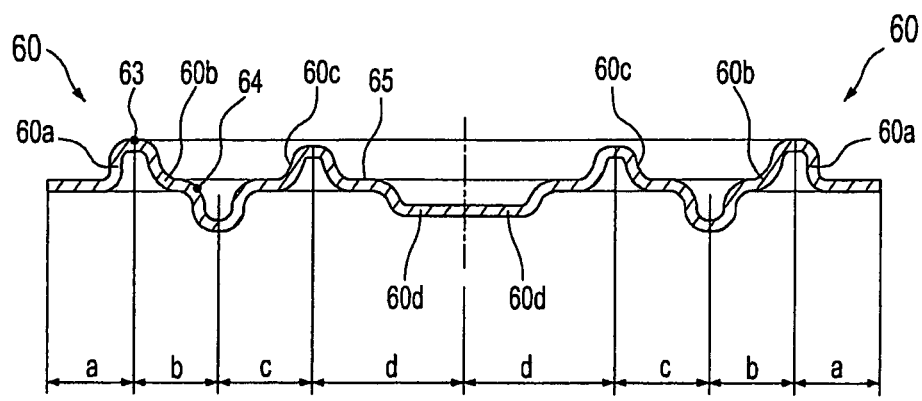
FIG. 6 is a sectional view of FIG. 5.

FIG. 5 is a perspective view of the filter member of the oven range according to the embodiment, and FIG. 6 is a sectional view of the filter member of the oven range as shown in FIG. 5.

As shown in FIG. 5 and FIG. 6, the filter member 60 has a substantially circular form and includes a plurality of sections 60a, 60b, 60c and 60d which are interconnected, being inclined upward or downward with respect to one another.

More specifically, the filter member 60 includes a first section 60a disposed at the outermost part thereof and inclined upward, a second section 60b connected with the first section 60a and inclined downward, a third section 60c connected with the second section 60b and inclined upward, and a fourth section 60d connected with the third section 60c and inclined downward.

Thus, as an upward inclined section such as the first section 60a is connected with a downward inclined section such as the second section 60b, the filter member 60 is constituted by a plurality of curves.

Accordingly, the filter member 60 has curve points 63 at connection parts between the respective adjoining sections. That is, the respective sections 60a, 60b, 60c and 60d of the filter member 60 are divided with respect to the curve points 63. Here, the curve points 63 have respectively different heights with respect to an outer side of the filter member 60.

Being discharged through the filter member 60 including the above described sections 60a, 60b, 60c and 60d, particles of the toxic gas are dispersed by the curve surfaces of the filter member 60.

More particularly, the toxic gas that is entangled and mixed by the curve surfaces having different heights is passed through the filter member 60 at a low speed. Since the toxic gas slowly passes through the surfaces of the filter member 60, the toxic gas may react with the catalyst coating the filter member 60 for a longer time, thereby improving the effect of purification of the toxic gas.

In addition, as an example, the filter member 60 may have irregular curves so that the toxic gas is entangled and mixed more easily while being discharged through the filter member 60. Therefore, respective sections of the filter member 60 may each have at least one point of inflection 64.

Furthermore, the filter member 60 may be configured in a manner that the sections 60a, 60b, 60c and 60d have respectively different areas and at least one of them has a horizontal portion 65, so that the toxic gas passing through the filter member 60 is induced to large-area parts and therefore efficiently entangled and mixed.

Although not shown, in the filter member 60, the adjoining sections may be inclined in the same direction. That is, the filter member 60 may be inclined either upward or downward only.

In this case, a plurality of the inflection points 64 are formed in the filter member 60 and the respective sections of the filter member 60 may be divided with respect to the inflection points 64 and interconnected.

Also, although not shown, the filter member 60 may have a plurality of sections inclined upward or downward and interconnected. The sections of the filter member 60 may be inclined irregularly upward or downward and interconnected.

Here, the filter member 60 has a plurality of the curve points 63 and the inflection points 64, and the respective sections of the filter member 60 may be divided with respect to the curve points 63 and the inflection points 64.

Figure 7:
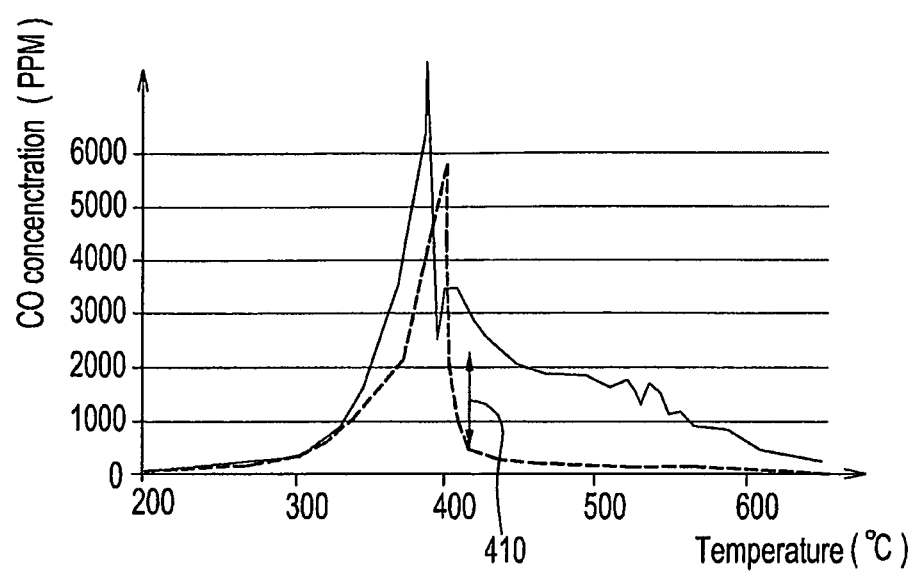
FIG. 7 is a graph explaining an operational effect of the oven range according to the embodiment.

FIG. 7 is a graph explaining the operational effect of the oven range according to the embodiment. The graph shows the concentration of CO discharged through the gas outlet according to the inner temperature of the cavity.

More particularly, the solid line in the graph of FIG. 7 shows the concentration of CO being discharged through a conventional filter member, while the dotted line shows the concentration of CO being discharged through the filter member according to the embodiment, according to the inner temperature of the cavity. Thus, the filter member of the present embodiment provides an unexpected result in comparison to the conventional filter member.

As shown in FIG. 7, the filter member 60 according to the embodiment discharges a lower concentration of CO in comparison to the conventional filter member. Especially, the CO concentration is considerably decreased at about 390~410° C. where the self-cleaning is performed to remove foreign substances accumulated in the cavity 17.

Thus, according to the embodiment, as the toxic gas discharged through the filter member is dispersed and mixed by irregular curve surfaces of the filter member, a reaction time between the toxic gas and the filter member is increased, thereby improving the toxic gas purification efficiency.

As is apparent from the above description, an oven range according to the embodiment may efficiently purify toxic gas being discharged through a filter member because the toxic gas is dispersed, entangled and mixed by irregular curve surfaces of the filter member and accordingly the toxic gas reacts to a catalyst coating the filter member for a longer time.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A filter member for an oven range, disposed at a gas outlet formed at a cavity of the oven range, the filter member comprising:
   a plurality of sections inclined upward or downward with respect to one another and interconnected such that an upwardly inclined section is connected to a downwardly inclined section,
   wherein at least one of the plurality of sections of the filter member has an irregular curve from one end of the at least one section to the other end of the at least one section,
   wherein curve points formed at connection parts of the respective sections of the filter member have respectively different heights, and
   wherein the curve points formed at the connection parts of two most outer sections of the filter member have heights higher than heights of other curve points of the sections of the filter member.

2. The filter member according to claim 1, wherein the sections of the filter member have respectively different areas.

3. The filter member according to claim 1, wherein at least one of the sections of the filter member has at least two points of inflection.

4. The filter member according to claim 1, wherein the filter member is formed in a round shape.

5. An oven range, comprising:
   a cavity having a gas outlet;
   a discharge duct connected to the gas outlet; and
   a filter member disposed at the gas outlet to purify toxic gas generated in the cavity and discharged through the gas outlet, the filter member including a plurality of sections inclined upward or downward with respect to one another and interconnected,
   wherein at least one of the plurality of sections of the filter member has an irregular curve from one end of the at least one section to the other end of the at least one section,
   wherein curve points formed at connection parts of the respective sections of the filter member have respectively different heights with respect to an outer side of the filter member, and
   wherein the curve points formed at the connection parts of two most outer sections of the filter member have heights higher than heights of other curve points of the sections of the filter member.

6. The oven range according to claim 5, wherein one of the sections adjoining an upwardly inclined section is inclined downward.

7. The oven range according to claim 5, wherein at least one of the sections of the filter member has at least two points of inflection.

8. The oven range according to claim 5, wherein the sections of the filter member have respectively different areas.

9. The oven range according to claim 5, wherein at least one of the sections of the filter member has a horizontal portion.

10. The oven range according to claim 9, wherein the horizontal portion is provided in the middle of the filter member.

11. The oven range according to claim 5, wherein the filter member is coated with a catalyst comprising Pd and Pt.

12. The oven range according to claim 5, wherein the sections of the filter member are inclined upward with respect to a central longitudinal axis of the filter member.

13. The oven range according to claim 5, wherein the sections are alternately inclined upward and downward with respect to adjoining sections.

14. The oven range according to claim 5, wherein the filter member is formed in a round shape.

15. The oven range according to claim 1, wherein the filter member includes a mesh made of stainless steel.

* * * * *